(12) United States Patent
Chiang et al.

(10) Patent No.: US 11,852,961 B2
(45) Date of Patent: Dec. 26, 2023

(54) PROJECTION DEVICE, PROJECTION SYSTEM AND METHOD FOR CALIBRATING PROJECTED IMAGE

(71) Applicant: BENQ CORPORATION, Taipei (TW)

(72) Inventors: Chin-Fu Chiang, New Taipei (TW); Tung-Chia Chou, New Taipei (TW); Chang-Sheng Lee, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/827,848

(22) Filed: May 30, 2022

(65) Prior Publication Data

US 2023/0010763 A1 Jan. 12, 2023

(30) Foreign Application Priority Data

Jul. 6, 2021 (CN) .......................... 202110759786.5

(51) Int. Cl.
*G03B 21/14* (2006.01)
*G03B 21/20* (2006.01)

(52) U.S. Cl.
CPC ......... *G03B 21/147* (2013.01); *G03B 21/142* (2013.01); *G03B 21/2006* (2013.01)

(58) Field of Classification Search
CPC .... G03B 21/13; G03B 21/142; G03B 21/147; G03B 21/2006; G03B 37/005; G03B 37/04; G03B 37/06; H04N 9/3141; H04N 9/3158; H04N 9/3182; H04N 9/3185; H04N 9/3188; H04N 9/3194
See application file for complete search history.

(56) References Cited

U.S. PATENT DOCUMENTS

| | | | |
|---|---|---|---|
| 2008/0259223 A1* | 10/2008 | Read | H04N 9/3147 353/30 |
| 2009/0040133 A1* | 2/2009 | Clodfelter | H04N 9/3147 345/204 |
| 2019/0320148 A1* | 10/2019 | Sugimoto | H04N 9/3147 |
| 2020/0134798 A1* | 4/2020 | Cian | G06T 5/50 |
| 2021/0072629 A1* | 3/2021 | Aizaki | G03B 33/12 |
| 2022/0070421 A1* | 3/2022 | Nagata | G03B 21/2033 |

* cited by examiner

*Primary Examiner* — Sultan Chowdhury

(57) ABSTRACT

A projection device, a projection system and a method for calibrating projected image are provided. The projection device and an external projection device the same image source and respectively project an image and another image corresponding to the image source. The same portion of the image source where the two images overlap each other forms an overlapping area. The projection device includes a lens, a light shielding member and a processor. The light shielding member is disposed on the lens. The processor controls the light shielding member to selectively shade a partial area of the lens according to the brightness of the image source, wherein the partial area corresponds to the overlapping area.

17 Claims, 6 Drawing Sheets

PROJECTION DEVICE, PROJECTION SYSTEM AND METHOD FOR CALIBRATING PROJECTED IMAGE

This application claims the benefit of People's Republic of China patent application Serial No. 202110759786.5, filed Jul. 6, 2021, the invention of which are incorporated by reference herein in its entirety.

TECHNICAL FIELD

The present invention relates in general to a device, a system and a method for calibrating image, and more particularly to a projection device, a projection system and a method for calibrating projected image.

BACKGROUND

With the advancement of display technology, some projection technologies have been developed for displaying large images, such as for large advertising boards, interactive experience areas in exhibition halls, etc. This projection technology can be realized by two or more projection devices, each projecting its own image and these images can be stitched together to form a complete picture.

When images are stitched together, each image partially overlaps with the neighboring images to form a fusion area to avoid gaps between images and to make the projected image visually smoother and more fluid. However, the current technology still has some problems for this fusion area that have not been taken seriously and solved, resulting in uneven brightness when projecting certain scenes.

SUMMARY

The present invention is directed to a projection device, a projection system and a method for calibrating projected image. By providing a light shielding member disposed on the lens of one of the projection devices, the light shielding member is controlled to shade a partial area of the lens in some cases to shade the light projected onto the overlapping area and improve the problem of excessive brightness of the overlapping area under certain circumstances.

According to one aspect of the present invention, a projection system is provided. The projection system includes a first projection device and a second projection device. The first projection device includes a lens and a light shielding member disposed on the lens. The first projection device and the second projection device receive the same image source and respectively project a first image and a second image corresponding to the image source, wherein the same portion of the image source where the first image overlaps the second image forms an overlapping area. The first projection device controls the light shielding member to selectively shade a partial area of the lens according to the brightness of the image source, the partial area corresponding to the overlapping area.

According to another aspect of the present invention, a method for calibrating projected image applicable to a first projection device and a second projection device is provided. The method includes the following steps. First, the first projection device and the second projection device receive the same image source and respectively project a first image and a second image corresponding to the image source. Next, the first projection device and the second projection device are adjusted such that the same portion of the image source where the first image overlaps the second image forms an overlapping area. Then, a light shielding member disposed on the first projection device is controlled according to the brightness of the image source such that the light shielding member selectively shades a partial area of a lens of the first projection device, wherein the partial area corresponds to the overlapping area.

According to still another aspect of the present invention, a projection device is provided. The projection device and an external projection device receive the same image source and respectively project an image and another image corresponding to the image source, wherein the same portion of the image source where the two images overlap each other forms an overlapping area. The projection device includes a lens, a light shielding member and a processor. The light shielding member is disposed on the lens. The processor is configured to control the light shielding member to selectively shade a partial area of the lens according to the brightness of the image source, wherein the partial area corresponds to the overlapping area.

The above and other aspects of the invention will become better understood with regard to the following detailed description of the preferred but non-limiting embodiment(s). The following description is made with reference to the accompanying drawings.

DETAILED DESCRIPTION

A light shielding member is provided in the present invention to shade a partial area of the lens to shade the light projected onto the overlapping area, improving the problem of excessive brightness of the overlapping area under certain circumstances.

Embodiments of the present invention will be described in detail hereinafter, and illustrated with the accompanying drawings. In addition to these detailed descriptions, the present invention may be broadly implemented in other embodiments, and any substitutable, modified, equivalent variations of the embodiments are included within the scope of the present invention. The scope of the present is subject to the claims thereafter. In the description of the specification, many specific details and examples of embodiments are provided in order to provide the reader with a more complete understanding of the present invention; however, these specific details and examples of embodiments should not be considered as limitations of the present invention. In addition, well-known steps or elements are not described in detail to avoid unnecessary limitations of the present invention.

Figure 1:
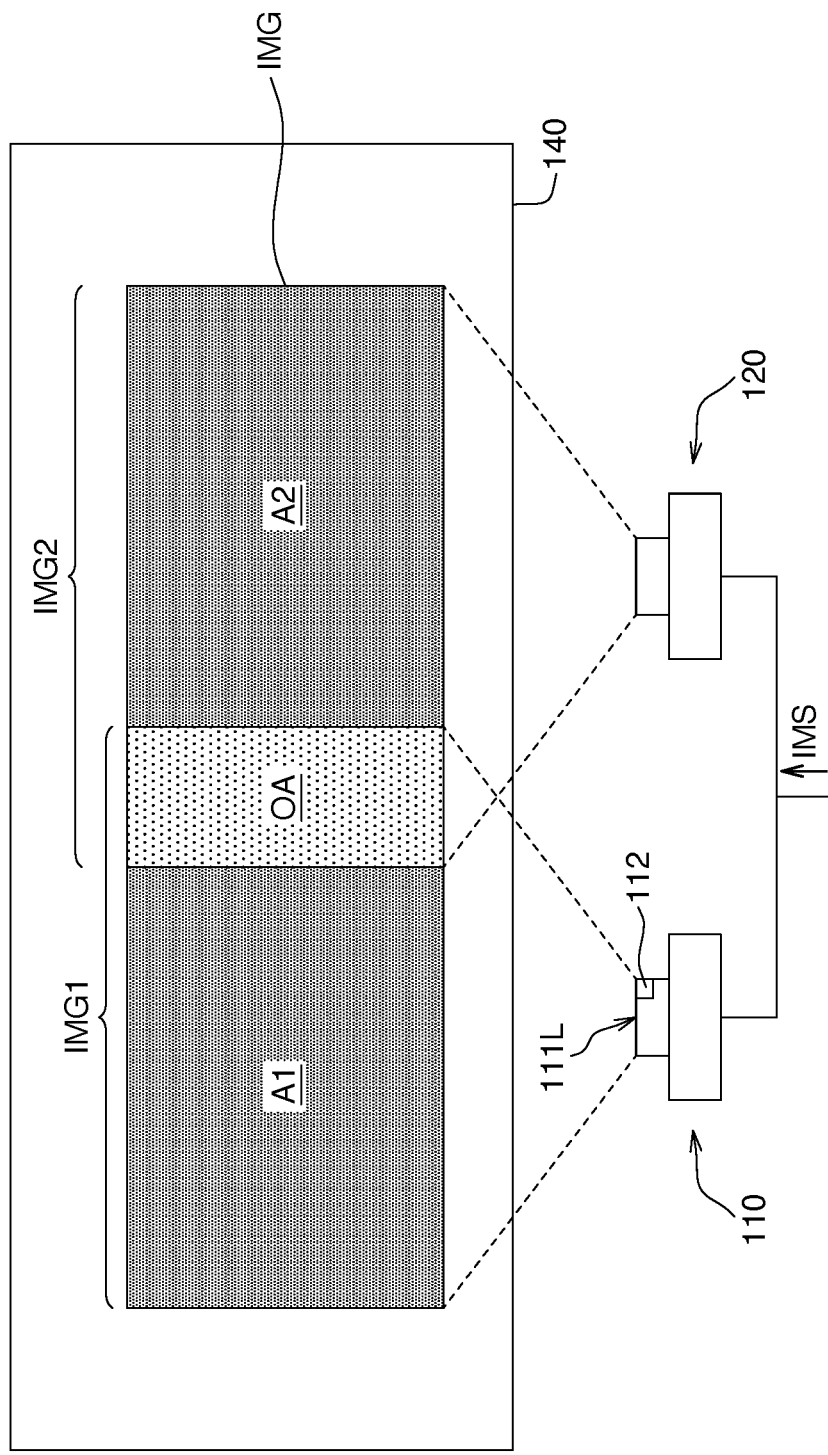
FIG. 1 is a schematic diagram of a projection system according to one embodiment of the present invention, illustrating a condition where a method for calibrating projected image of the present invention has not been performed.
Figure 2:
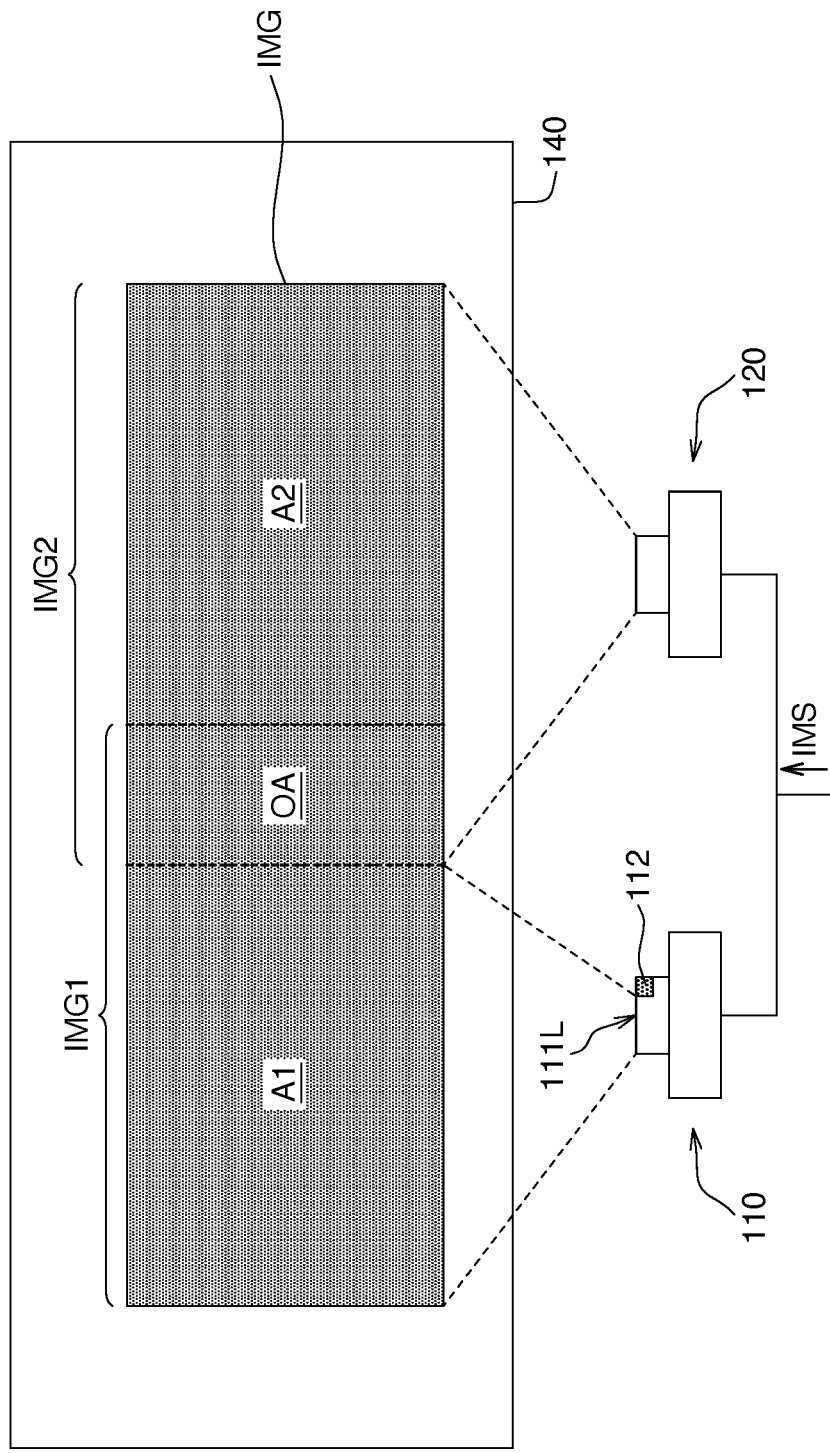
FIG. 2 is a schematic diagram of the projection system according to one embodiment of the present invention, illustrating a condition where the method for calibrating projected image of the present invention has been performed.

FIG. 1 is a schematic diagram of a projection system 100 according to one embodiment of the present invention, illustrating a condition where a method for calibrating projected image of the present invention has not been performed. FIG. 2 is a schematic diagram of the projection system 100 according to one embodiment of the present invention, illustrating a condition where the method for calibrating projected image of the present invention has been performed.

Referring to FIG. 1, the projection system 100 includes a first projection device 110, a second projection device 120 and an image supply 130. The first projection device 110 and the second projection device 120 receive the same image source IMS from the image supply 130, and respectively project a first image IMG1 corresponding to a first portion of the image source IMS and a second image IMG2 corresponding to a second portion of the image source IMS onto a projection surface 140 to display a complete image IMG. The same portion of the image source IMS where the first image IMG1 overlaps the second image IMG2 forms an overlapping area OA on the projection surface 140.

To achieve such a stitched image effect, the first projection device 110 and the second projection device 120 are usually the same or similar models, and therefore their output brightness capabilities also are the same or similar. In general, the first projection device 110 and the second projection device 120 may respectively adjust the brightness of the light projected onto the overlapping area OA; for example, each halving the brightness of the light projected onto the overlapping area OA so that the brightness of the light of the overlapping area OA is approximately similar to the brightness of the light of the non-overlapping areas A1 and A2, so that the brightness of the light of the overlapping area OA is not too bright compared to the brightness of the non-overlapping areas A1 and A2.

However, the first projection device 110 and the second projection device 120 have a minimum output brightness; that is, the first projection device 110 and the second projection device 120 do not project a "completely black" picture, but still have some brightness. When the overall brightness of the image source IMS is low, for example, when the projected image is at dusk or even at night, the brightness of the light projected by the first projection device 110 and the second projection device 120 onto the non-overlapping areas A1 and A2 is still greater than their respective minimum output brightness, but it is not possible to reduce the brightness of the light projected onto the overlapping area OA to less than their respective minimum output brightness. The first projection device 110 and the second projection device 120 still project light at their respective minimum output brightness into the overlapping area OA, so that the brightness of the light of the overlapping area OA is higher than that of the non-overlapping area A1, A2, as shown in FIG. 1.

For the purpose of illustration, an example is given herein, but is not intended to limit the present invention. If the first projection device 110 and the second projection device 120 have a minimum output brightness of 30 lumens (lm) respectively, and now it is need to project an image source IMS with a luminance of 50 lumens onto the projection surface 140, the first projection device 110 and the second projection device 120 may still project the first image IMG1 and the second image IMG2 with a luminance of 50 lumens onto the non-overlapping areas A1 and A2. However, the first projection device 110 and the second projection device 120 are unable to halve the brightness of the light projected onto the overlapping area OA (i.e., respectively reduce the brightness of the light projected onto the overlapping area OA to 25 lumens, which is below 30 lumens); instead, the first projection device 110 and the second projection device 120 project light onto the overlapping area OA at a brightness of 30 lumens each, resulting in a brightness of 60 lumens in the overlapping area OA. The brightness of the overlapping area OA is 60 lumens, which is brighter than the brightness of the non-overlapping areas A1 and A2.

To solve this problem, as shown in FIG. 1, one projection device (in this case, the first projection device 110) further includes a light shielding member 112 disposed on the lens 111L of the first projection device 110. The first projection device 110 may control the light shielding member 112 to selectively shade a partial area of the lens 111L according to the brightness of the image source IMS.

Referring to FIG. 2, the light shielding member 112 is disposed on the partial area of the lens 111L, and the partial area corresponds to the overlapping area OA. Specifically, the light shielding member 112 is disposed at a position where the lens 111L of the first projection device 110 projects light onto the overlapping area. When the brightness of the image source IMS meets a particular condition (such as, but not limited to, the condition cited in the preceding example), the light shielding member 112 may be controlled to shade the partial area of the lens 111L such that the light projected by the first projection device 110 onto the overlapping area OA is completely shaded. At the same time, the second projection device 120 does not reduce the brightness of the light projected onto the overlapping area OA; that is, the second projection device 120 may project the second image IMG2 with the same brightness onto both the overlapping area OA and the non-overlapping area A2 at the same time. In this way, the brightness of the complete image IMG projected onto the projection surface 140 may be presented with a uniform visual experience.

Figure 3:
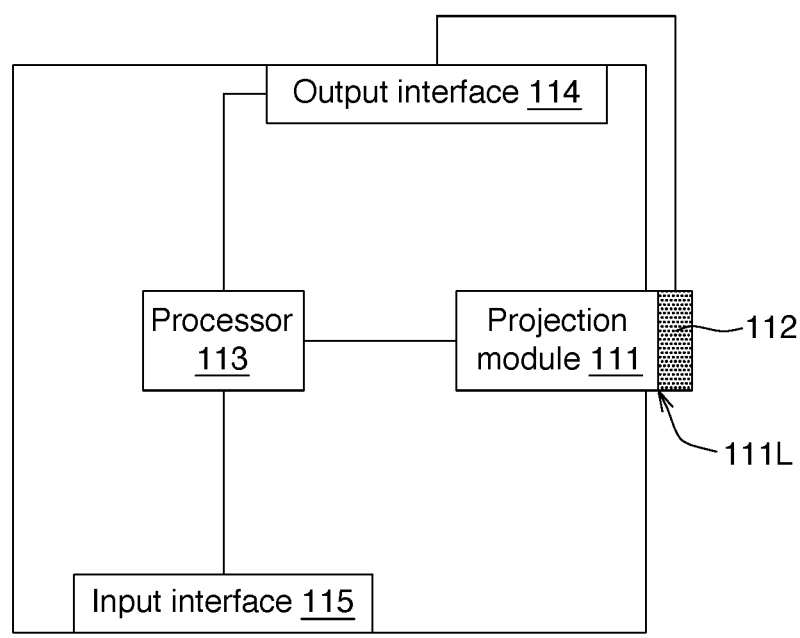
FIG. 3 is a block diagram of the first projection device according to one embodiment of the present invention.

Referring to FIG. 3, a block diagram of the first projection device 110 according to one embodiment of the present invention is shown. The projection device 110 includes a projection module 111, a processor 113, an output interface 114 and an input interface 115. The processor 113 is respectively coupled to the projection module 111, the output interface 114 and the input interface 115. The light shielding member 112 is disposed on the lens 111L of the projection module 111. Furthermore, the output interface 114 is further coupled to the light shielding member 112.

As show in FIGS. 1-3, the processor 113 may receive the first image IMG1 corresponding to the first portion of the image source IMS via the input interface 115, and transmit the first image IMG1 to the projection module 111 for the projection module 111 to project the first image IMG1 onto the projection surface 140. In addition, the processor 113 may further selectively transmit a shielding signal to the light shielding member 112 via the output interface 114 according to the brightness of the image source IMS so as to control the light shielding member 112 to shade the partial area of the lens 111L.

Figure 4:
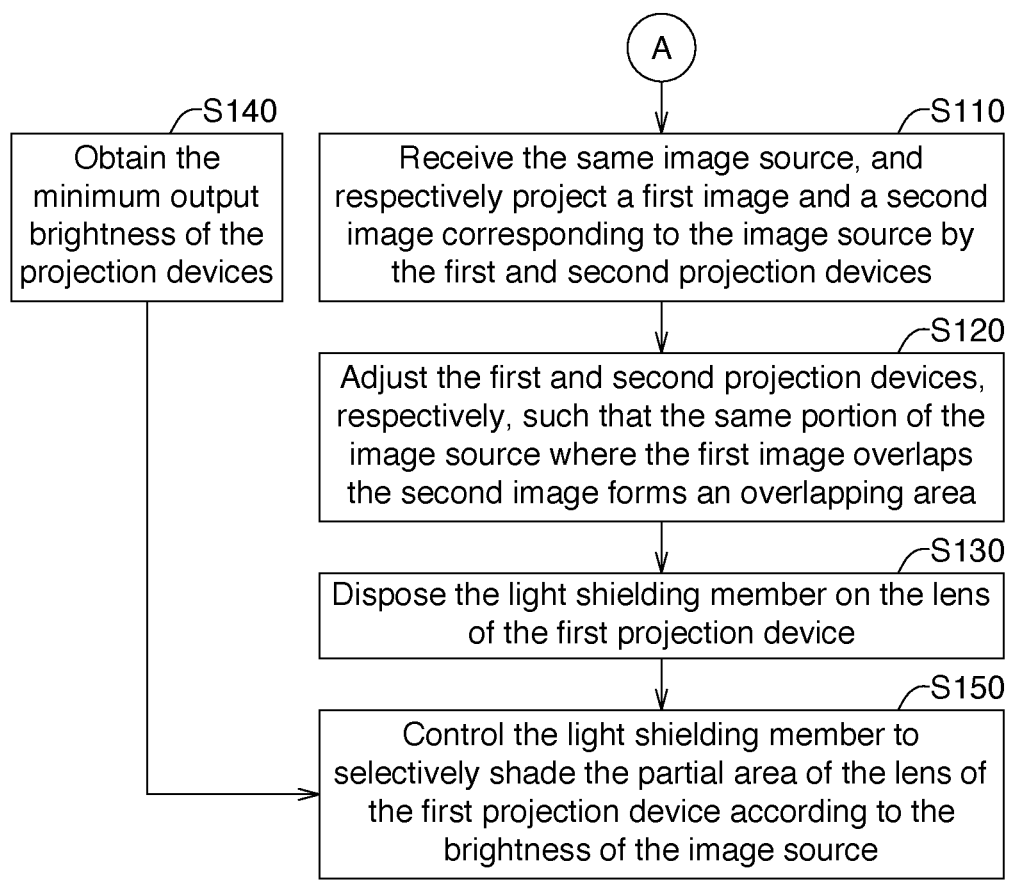
FIG. 4 is a flowchart of the method for calibrating projected image according to one embodiment of the present invention.

FIG. 4 is a flowchart of the method S100 for calibrating projected image according to one embodiment of the present invention. Referring to FIGS. 1-4, first, in step S110, the first projection device 110 and the second projection device 120 receive the same image source IMS, and respectively project a first image IMG1 and a second image IMG2 corresponding to the image source IMS. Here, the first projection device 110 and the second projection device 120 may respectively receive image data of the first image IMG1 corresponding to the first portion of the image source IMS and of the second image IMG2 corresponding to the second portion of the image source IMS, and project an image light onto the projection surface 140 based on the respective received image data to form the first image IMG1 and the second image IMG2 corresponding to their image data on the projection surface 140.

Next, in step S120, the first projection device 110 and the second projection device 120 are adjusted, respectively, such that the same portion of the image source IMS where the first image IMG1 overlaps the second image IMG2 forms an overlapping area OA. Then, in step S130, the light shielding member 112 is disposed on the lens 111L of the first projection device 110. Specifically, the light shielding member 112 is disposed on a partial area of the lens 111L, and the partial area corresponds to a position where the lens 111L projects light onto the overlapping area OA.

Afterwards, in step S150, the processor 113 of the first projection device 110 controls the light shielding member 112 according to the brightness of the image source IMS such that the light shielding member 112 selectively shades the partial area of the lens 111L of the first projection device 110.

Figure 5:
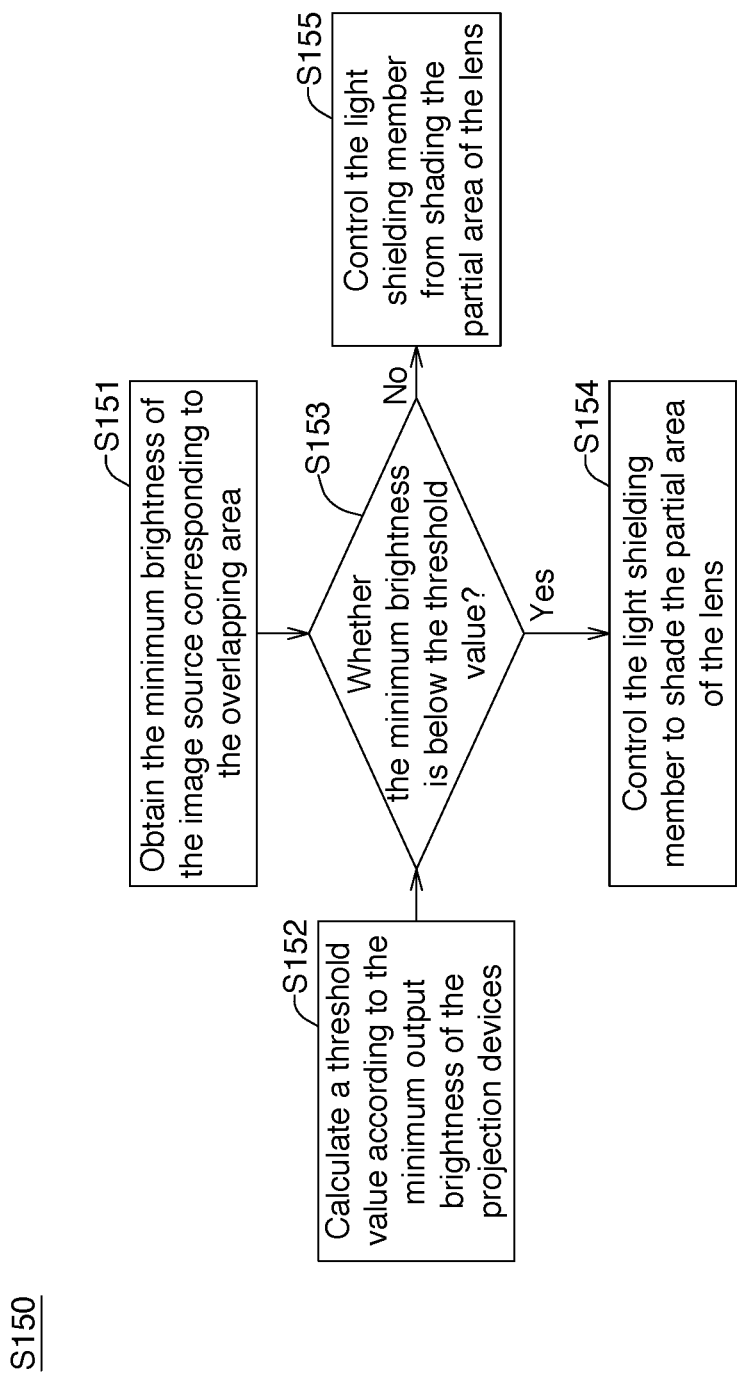
FIG. 5 is a flowchart showing the step of controlling the light shielding member according to the brightness of the image source according to one embodiment of the present invention.

FIG. 5 is a flowchart showing the step S150 of controlling the light shielding member 112 according to the brightness of the image source IMS according to one embodiment of the present invention. Further, before step S150, the minimum output brightness of the first projection device 110 and the second projection device 120 shall be obtained, as shown in step S140 of FIG. 4.

Figure 6:
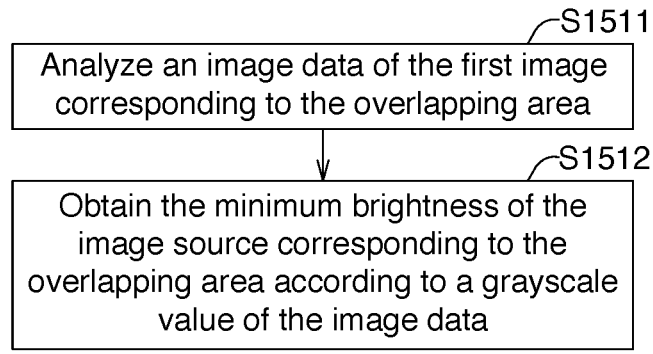
FIG. 6 is a flowchart showing the step of obtaining the minimum brightness of the image source corresponding to the overlapping area according to one embodiment of the present invention.

Then, referring to FIGS. 1-3 and 5, in step S151, the processor 113 obtains the minimum brightness of the image source IMS corresponding to the overlapping area OA. Here, referring to FIG. 6, a flowchart showing the step S151 of obtaining the minimum brightness of the image source IMS corresponding to the overlapping area OA according to one embodiment of the present invention is shown. In step S1511, the processor 113 analyzes an image data of the first image IMG1 corresponding to the overlapping area OA. In step S1512, the processor 113 obtains the minimum brightness of the image source IMS corresponding to the overlapping area OA according to a grayscale value of the image data. That is, the processor 113 may calculate the minimum brightness of the image source IMS corresponding to the overlapping area OA according to the grayscale value of the image data of the first image IMG1.

Returning to FIGS. 1-3 and 5, next, in step S153, the processor 113 determines whether the minimum brightness is below a threshold value, which may be calculated by step S152. In step S152, the processor 113 calculates the threshold value according to the minimum output brightness of the first projection device 110 and the second projection device 120 (already known from step S140). For example, if the minimum output brightness of the first projection device 110 and the second projection device 120 is 30 lumens each, the threshold value may be the sum of the minimum output brightness of the first projection device 110 and the second projection device 120, which is 60 lumens.

If the minimum brightness is determined to be below the threshold value, step S154 is performed, and the processor 113 transmits a shielding signal to the light shielding member 112 via the output interface 114, causing the light shielding member 112 to shade the partial area of the lens 111L to completely shade the light projected onto the overlapping area OA. If it is determined that the minimum brightness is not below the threshold value, step S155 is performed, and the processor 113 does not transmit a shielding signal to control the light shielding member 112 from shading the partial area of the lens 111L.

That is, if the minimum brightness of the image source IMS corresponding to the overlapping area OA is found to be below a preset threshold value, the light shielding member 112 may be immediately controlled to shade the light projected onto the overlapping area OA, solving the problem of excessive brightness of the overlapping area OA under certain circumstances. In addition, since the first projection device 110 and the second projection device 120 are usually the same or similar models, they should have the same or similar minimum output brightness. Therefore, for the dual projection device of the present embodiment, the threshold value may be pre-set to 2 times of the minimum output brightness. However, in practice, the threshold value may be adjusted according to the actual usage situation.

Figure 7:
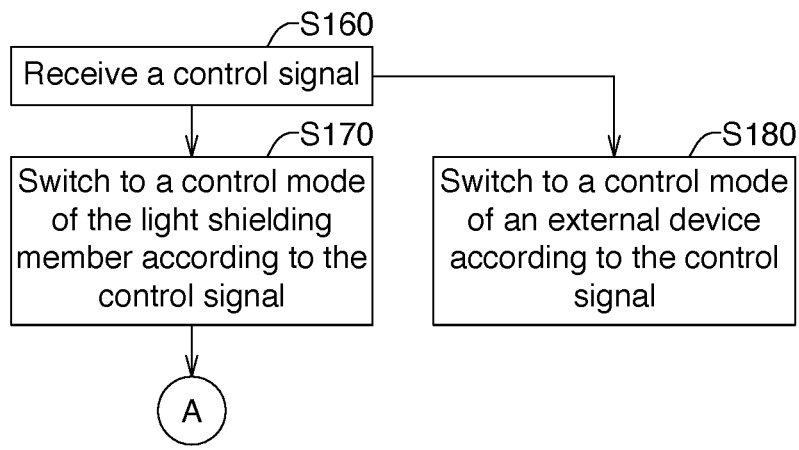
FIG. 7 is a flowchart showing additional steps of the method for calibrating projected image used in one embodiment of the present invention.

FIG. 7 is a flowchart showing additional steps of the method S100 for calibrating projected image used in one embodiment of the present invention. Referring to FIGS. 1-4 and 7, in the present invention, the output interface 114 may include at least one connection terminal. In one embodiment, the connection terminal may be a trigger terminal, and the trigger terminal may be used to switch the mode of the first projection device 110. Specifically, the mode of the first projection device 110 may be switched in advance before step S110.

As shown in step S160 of FIG. 7, the processor 113 may first receive a control signal via the input interface 115. The user may select which mode the first projection device 110 is currently in according to his or her needs, such as by remote control, pressing a physical button, clicking a touch screen on the first projection device 110, etc. to perform an input operation to send a control signal that causes the processor 113 to selectively switch the first projection device 110 to a control mode of the light shielding member (step S170) or a control mode of an external device (step S180) according to the control signal. If it is switched to the control mode of the light shielding member, step S170 is followed by node A and step S110 is continued. At this time, the trigger terminal of the output interface 114 is coupled to the light shielding member 112; once the minimum brightness of the image source IMS corresponding to the overlapping area OA is found to be below the preset threshold value, the processor 113 may transmit a shielding signal to the light shielding member 112 via the trigger terminal. If it is switched to the control mode of an external device, the trigger terminal of the output interface 114 is switched to be coupled to an external device, such as a motorized screen; when the power of the first projection device 110 is turned on, the processor 113 may transmit a start signal to the motorized screen via the trigger terminal to automatically lower the motorized screen, and then the subsequent process of step S110 does not proceed. Therefore, the user may select the control mode of the first projection device 110 according to whether the image stitching process is currently required to determine the coupling object of the trigger terminal of the output interface 114.

In addition, the connection terminal may be other than a trigger terminal. In other embodiments, the connection terminal may be an HDMI terminal or a USB terminal, which is also suitable for coupling with the light shielding member 112.

In summary, a projection device, a projection system and a method for calibrating projected image are provided in the present invention. By providing a light shielding member disposed on the lens of one of the projection devices, the light shielding member is controlled to shade a partial area of the lens in some cases to shade the light projected onto the overlapping area and improve the problem of excessive brightness of the overlapping area under certain circumstances.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A projection system comprising:
   a first projection device comprising a lens and a light shielding member disposed on the lens; and
   a second projection device, wherein the first projection device and the second projection device receive an identical image source and respectively project a first image and a second image corresponding to the image source, and the same portion of the image source where the first image overlaps the second image forms an overlapping area;
   wherein when a minimum brightness of the image source corresponding to the overlapping area is below a threshold value, the first projection device controls the light shielding member to shade a partial area of the lens, the partial area corresponding to the overlapping area.

2. The projection system according to claim 1, wherein when the first projection device controls the light shielding member to shade the partial area of the lens, the light shielding member completely shades the light projected by the first projection device onto the overlapping area.

3. The projection system according to claim 1, wherein the threshold value is the sum of the minimum output brightness of the first projection device and the second projection device.

4. The projection system according to claim 1, wherein the first projection device comprises a processor, the processor analyzes an image data of the first image corresponding to the overlapping area and obtains the minimum brightness of the image source corresponding to the overlapping area according to a grayscale value of the image data.

5. The projection system according to claim 4, wherein the first projection device further comprises an input interface and an output interface, the processor is coupled to the input interface and the output interface, respectively, and the output interface is coupled to the light shielding member, wherein the processor receives the image data via the input interface and selectively transmits a shielding signal to the light shielding member via the output interface according to the image data.

6. The projection system according to claim 5, wherein the output interface comprises at least one connection terminal, which is a trigger terminal, an HDMI terminal or a USB terminal.

7. The projection system according to claim 5, wherein the processor further receives a control signal from the input interface and selectively switches the first projection device to a control mode of the light shielding member or a control mode of an external device according to the control signal;
   wherein when the first projection device is switched to the control mode of the light shielding member, the processor selectively transmits the shielding signal to the light shielding member according to the image data.

8. A method for calibrating projected image, applicable to a first projection device and a second projection device, comprising:
   receiving an identical image source and respectively projecting a first image and a second image corresponding to the image source by the first projection device and the second projection device;
   adjusting the first projection device and the second projection device such that the same portion of the image source where the first image overlaps the second image forms an overlapping area; and
   obtaining a minimum brightness of the image source corresponding to the overlapping area;
   wherein when the minimum brightness of the image source corresponding to the overlapping area is below a threshold value, the first projection device controls a light shielding member disposed on the first projection device to shade a partial area of a lens of the first projection device, the partial area corresponding to the overlapping area.

9. The method for calibrating projected image according to claim 8, wherein when the first projection device controls the light shielding member to shade the partial area of the lens, the light shielding member completely shades the light projected by the first projection device onto the overlapping area.

10. The method for calibrating projected image according to claim 8, wherein the threshold value is the sum of the minimum output brightness of the first projection device and the second projection device.

11. The method for calibrating projected image according to claim 8, wherein the step of obtaining the minimum brightness of the image source corresponding to the overlapping area comprises:
    analyzing an image data of the first image corresponding to the overlapping area and obtaining the minimum brightness of the image source corresponding to the overlapping area according to a grayscale value of the image data by a processor of the first projection device.

12. The method for calibrating projected image according to claim 11, further comprising:
    receiving a control signal and selectively switching the first projection device to a control mode of the light shielding member or a control mode of an external device according to the control signal by the processor;
    wherein when the first projection device is switched to the control mode of the light shielding member, the processor performs the step of controlling the light shielding member according to the brightness of the image source.

13. A projection device, the projection device and an external projection device receiving an identical image source and respectively projecting an image and another image corresponding to the image source, the same portion of the image source where the two images overlap each other forming an overlapping area, the projection device comprising:

a lens;

a light shielding member disposed on the lens;

a processor configured to control the light shielding member to selectively shade a partial area of the lens according to the brightness of the image source, the partial area corresponding to the overlapping area; and an output interface respectively coupled to the processor and the light shielding member;

wherein the processor determines whether a minimum brightness of the image source corresponding to the overlapping area is below a threshold value, when the minimum brightness is below the threshold value, the processor transmits a shielding signal to the light shielding member via the output interface so that the light shielding member shades the partial area of the lens.

14. The projection device according to claim 13, wherein the threshold value is the sum of the minimum output brightness of the projection device and the external projection device.

15. The projection device according to claim 13, wherein the output interface comprises at least one connection terminal, which is a trigger terminal, an HDMI terminal or a USB terminal.

16. The projection device according to claim 13, further comprising an input interface coupled to the processor;

wherein the processor receives the image via the input interface, analyzes an image data of the image corresponding to the overlapping area, and obtains the minimum brightness of the image source corresponding to the overlapping area according to a grayscale value of the image data.

17. The projection device according to claim 16, wherein the processor further receives a control signal from the input interface and selectively switches the projection device to a control mode of the light shielding member or a control mode of an external device according to the control signal;

wherein when the projection device is switched to the control mode of the light shielding member, the processor selectively transmits the shielding signal to the light shielding member according to the image data.

* * * * *